United States Patent [19]
Iokibe et al.

[11] Patent Number: 5,748,851
[45] Date of Patent: May 5, 1998

[54] METHOD AND APPARATUS FOR EXECUTING SHORT-TERM PREDICTION OF TIMESERIES DATA

[75] Inventors: Tadashi Iokibe; Takayoshi Tanimura; Yasunari Fujimoto, all of Tokyo, Japan

[73] Assignee: Kabushiki Kaisha Meidensha, Tokyo, Japan

[21] Appl. No.: 395,980

[22] Filed: Feb. 28, 1995

[30] Foreign Application Priority Data

Feb. 28, 1994 [JP] Japan ................................ 6-029411
Apr. 1, 1994 [JP] Japan ................................ 6-064269

[51] Int. Cl.⁶ .................................................. G06F 15/18
[52] U.S. Cl. ............................................ 395/51; 395/10
[58] Field of Search ........................... 395/3, 10, 50–51, 395/60–61, 54, 900

[56] References Cited

PUBLICATIONS

T. Iokibe et al., "Short–term Prediction on Chaotic Timeseries by Local Fuzzy Reconstruction Method", Proc. Brazil–Japan Joint Symposium on Fuzzy Systems, 1994, pp. 136–139.

T. Iokibe et al., "Short–term Prediction on Chaotic Timeseries by Local Fuzzy Reconstruction Method", Proc. 3rd Intl. Conference on Fuzzy Logic, Neural Nets and Soft Computing, 1994, pp. 491–492.

Weigend et al, "Time Series Prediction: Forecasting the future and understanding the past"; Proceedings of the NATO Advanced Research Workshop on comparative time series analysis held in Santa Fe, NM, pp. 4–29, May, 1992.

Jang, "ANSIF: Adaptive–network–based fuzzy inference system"; IEEE Transactions on systems, Man, and Cybernetics, vol. 23, pp. 665–685, May, 1993.

Weigend et al, "Results of the time series prediction competition at the Santa Fe Institute"; 1993 IEEE International Conference on Neural Networks, pp. 1786–1793, Mar., 1993.

*Primary Examiner*—Tariq R. Hafiz
*Attorney, Agent, or Firm*—Foley & Lardner

[57] ABSTRACT

An apparatus for executing a short-term prediction of chaotic timeseries data includes a parameter determining section that changes each of parameter values according to the dynamics of observed chaotic timeseries data, and a predicting section that predicts a near future value of objective by reconstructing an attractor of timeseries data of the objective data in a multi-dimensional state space and by using vector neighboring to the data vector including the objective data. Therefore, it becomes possible to quickly and accurately execute a short-term prediction of chaotic timeseries data and to be responsive to the changes of the dynamics of the timeseries data.

8 Claims, 10 Drawing Sheets

ε1 : RANGE REPRESENTING NEIGHBOR ON a1 AXIS

ε2 : RANGE REPRESENTING NEIGHBOR ON a2 AXIS

ε3 : RANGE REPRESENTING NEIGHBOR ON a3 AXIS

— CALCULATED DATA    — PREDICTED DATA

FIG.11

METHOD AND APPARATUS FOR EXECUTING SHORT-TERM PREDICTION OF TIMESERIES DATA

BACKGROUND THE INVENTION

1. Field of the Invention

The present invention relates to improvements in a method and apparatus for executing a short-term prediction of chaotic timeseries data.

2. Description of the Prior Art

Conventionally, predictions of timeseries data have been executed by mainly utilizing an AR (auto regressive) model or an ARMA (auto regressive moving-average) model. Furthermore, in order to analyze chaotic phenomena, there have been researched the prediction of chaotic timeseries data by using a local reconstruction method according to a deterministic chaos theorem. For example, as the methods of this prediction, Gram-Schmidt's orthogonal system method and tessellation method have been proposed.

However, the former method has a drawback that prediction becomes impossible if the selected neighboring vector is not linearly independent. In case of the tessellation method, it also has a shortcoming that the time period of calculation increases abruptly as the dimension of reconstructed state space increases.

SUMMARY OF THE INVENTION

It is an object of the present invention to provide prediction method and apparatus that quickly and accurately execute a short-term prediction of chaotic timeseries data.

It is another object of the present invention to provide high-accuracy method and apparatus that are responsive to changes of the dynamics of the timeseries data.

A first aspect of the present invention is an apparatus that executes a short-term prediction of chaotic timeseries data. The apparatus comprises a data storage section for storing detected values of the timeseries data. A parameter determining section selects a value of each of parameters to be a component of the data vector. A predicting section generates data vector from the detected values of the timeseries data according to the parameter determined by said parameter determining section and for obtaining a predicted value by reconstructing an attractor into a predetermined dimensional state space by means of embedding. A prediction result storage section stores the obtained predicted value. A prediction result evaluating section detects a predicted value corresponding to the detected values of the timeseries data from the prediction result storage section and evaluates a prediction accuracy by comparing the detected value and the predicted value. The parameter determining section selects sample data at a predetermined time and a predetermined number of past data with respect to the sample data from said data storage section. The parameter determining section receives a predicted value of the sample data on the basis of each combination of the parameters from the predicting section. The parameter determining section compares the predicted value of the sample data from the prediction section with the actual value of the sample data. The parameter determining section again executes to select the value of the parameters so that the prediction accuracy of the sample data takes a maximum value, and outputs another selected value of the parameters to the prediction section.

A second aspect of the present invention is an apparatus for executing a short-term prediction of non-linear timeseries data. The apparatus comprises a storage section for storing observed timeseries data. A data vector generating section generates a data vector having a component that is constituted by the observed timeseries data from the storage section. An attractor reconstructing section generates an attractor of the observed timeseries data in an n-dimensional state space by an embedding operation of the data vector. A neighboring vector detecting section detects a plurality of vectors neighboring to the data vector generated in the data vector generating section. An axis component detecting section detects the difference between the axis component value of the detected neighboring vector and the axis component value of the data vector. A fuzzy inference section determines the axis component value of the data vector at a predetermined time period ahead upon detecting the axis component value of each of the neighboring vectors at the predetermined time period ahead, so as to decrease a difference between the detected axis component value of each neighboring vector at the predetermined time period ahead and the component value of the neighboring vector that generated the minimum difference in the axis component detecting section. A prediction data generating section generates the prediction timeseries data of the observed timeseries data by transforming the processing result in the axis component determining section into timeseries data.

A third aspect of the present invention is a method for executing a short-term prediction of chaotic timeseries data. The method comprises the steps of: (a) storing measured values of timeseries data; (b) selecting a value of each parameter to be a component of the data vector; (c) generating data vector from the detected values of the timeseries data according to the parameter determined by the step (b) and obtaining a predicted value by reconstructing an attractor into a predetermined dimensional state space by means of embedding; (d) storing the obtained predicted value; (e) evaluating a prediction accuracy by comparing the detected value and the predicted value upon detecting the predicted value corresponding to the detected values of the timeseries data from said step (d); (f) selecting sample data at a predetermined time and a predetermined number of past data with respect to the sample data from the step (a); (g) receiving a predicted value of the sample data on the basis of each combination of the parameters from the step (c); and (h) comparing the predicted value of the sample data from the step (c) with the actual value of the sample data, the step (b) again executing to select the value of the parameters so that the prediction accuracy of the sample data takes a maximum value, and outputting another selected values of the parameters to the step (c).

A fourth aspect of the present invention is a method for executing short-term prediction of timeseries data under chaotic behavior. The prediction apparatus comprises the steps of: (a) storing timeseries data to be observed; (b) generating a data vector whose component is constituted by the timeseries data from a storage means; (c) generating an attractor of the timeseries data in an n-dimension state space by embedding operation of the data vector; (d) detecting a plurality of vectors neighboring to the objective process data vector; (e) detecting the difference between the axis component value of the detected neighboring vector and the axis component value of the process objective data vector; (f) determining the axis component value of the data vector at a predetermined time period ahead upon detecting the axis component value of each of the neighboring vectors at the predetermined time period ahead, so as to decrease a difference between the detected axis component value of each neighboring vector at the predetermined time period ahead and the component value of the neighboring vector which generated the minimum difference in the step (e); and (g) generating the predicted value of the objective data by transforming the processing result in the step (e) into timeseries data.

DETAILED DESCRIPTION OF THE INVENTION

Referring to FIGS. 1 to 10, there is shown an embodiment of a short-term prediction apparatus for timeseries data having chaotic behavior in accordance with the present invention. This prediction apparatus is arranged to execute a short-term prediction of chaotic timeseries data according to the deterministic chaos theory.

In order to facilitate understanding of this invention, the explanation of the deterministic chaos theory will be discussed hereinafter.

Nearly all non-periodic, complex and irregular phenomena were formally considered indeterministic phenomena subordinate to randomness. Yet, apparently irregular, unstable and complex behavior can often be generated from a differential or difference equation governed by determinism where the subsequent states are all determined in principle, if once the initial value is given. This is the deterministic chaos of dynamical system. Thus, the deterministic chaos is defined as a phenomenon that appears to be irregular, but is governed by a distinct determinism.

When the behavior of any timeseries is chaotic, it can be assumed that the behavior follows a certain deterministic law. Then, if the nonlinear deterministic regularity can be estimated, data in the near future until the deterministic causality is lost can be predicted from the observed data at a certain time point because chaos has a "sharp dependency on initial condition". A prediction from the viewpoint of deterministic dynamical system is based on the Takens' theory for "reconstructing the state space and the attractor of the original dynamical system from single observed timeseries data". The Takens' theory is summarized below.

From observed timeseries data $y(t)$, vector $(y(t), y(t-\tau), y(t-2\tau), \ldots, y(t-(n-1)\tau))$ is generated, where "$\tau$" represents a time delay. This vector indicates one point of an n-dimensional reconstructed state space $R^n$. Therefore, a trajectory can be drawn in the n-dimensional reconstructed state space by changing "t". Assuming that the target system is a deterministic dynamical system and that the observed timeseries data is obtained through an observation system corresponding to $C^1$ continuous mapping from the state space of dynamical system to the one-dimensional Euclidean space R, the reconstructed trajectory is an embedding of the original trajectory when "n" value is sufficiently large. Namely, if any attractor has appeared in the original dynamical system, another attractor, which maintains the phase structure of the first attractor, will appear in the reconstructed state space. "n" is usually called an "embedding dimension".

In order that such reconstruction achieves "embedding", it has been proven that the dimension "n" should satisfy the following condition $n \geq 2m+1$, where "m" represents the state space dimension of the original dynamical system. However, this is a sufficient condition. Depending on data, embedding can be established even when "n" is less than 2m+1. Furthermore, it has been proven that the reconstructing operation is one-to one mapping if the n>2d (d: box count dimension of an original dynamic system). Accordingly, it becomes possible to accurately execute a short-term prediction to the timeseries data under the deterministic chaos.

Figure 1:
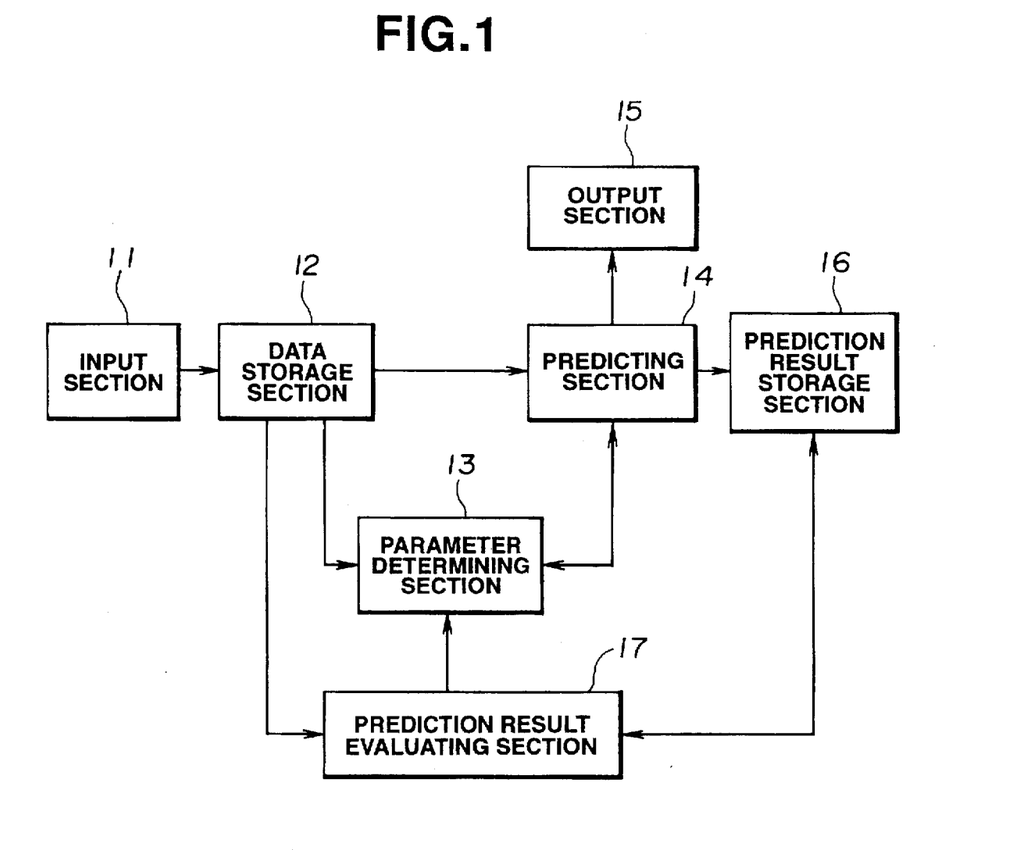
FIG. 1 is a block diagram of an embodiment of a prediction apparatus for a short-term predicting of a chaotic timeseries data in accordance with the present invention.

As shown in FIG. 1, the prediction apparatus according to the present invention comprises an input section 11, a data storage section 12, a parameter determining section 13, a predicting section 14, an output section 15, a prediction result storage section 16, and a prediction result evaluating section 17.

Figure 7:
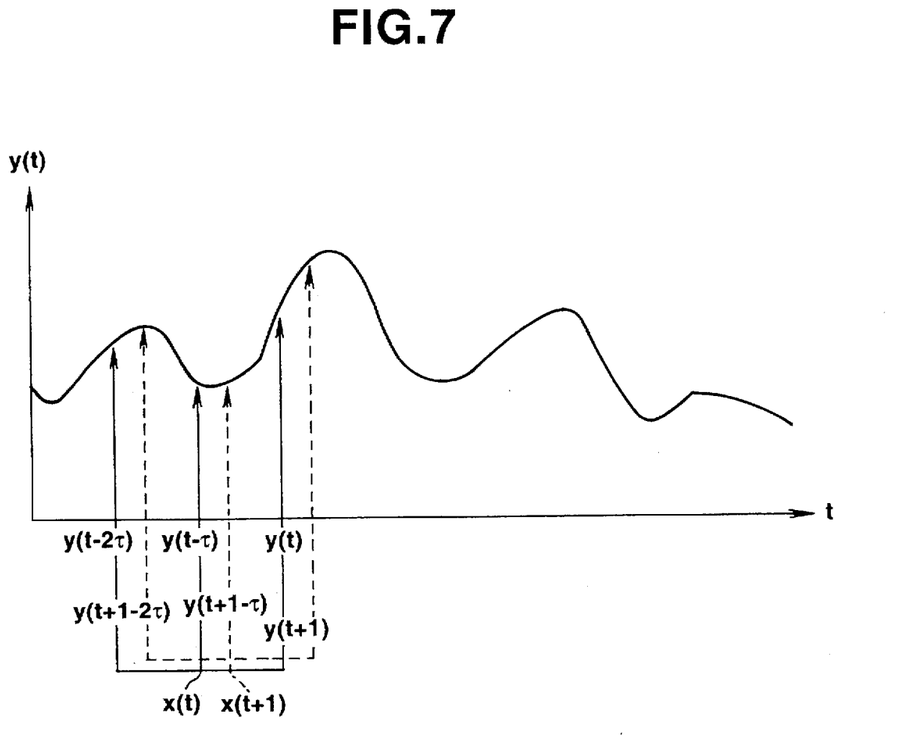
FIG. 7 is a graph showing timeseries data.

The input section 11 is arranged to read timeseries data $y(t)$ from an objective system shown in FIG. 7 at equal sampling time intervals. The data storage section 12 stores the timeseries data $y(t)$ read at the input section 11. The parameter determining section 13 executes a short-term prediction as to remaining data by varying the parameter within a predetermined range and by using several past data stored in the data storage section 12. That is, the parameters relating to the timeseries data are determined so as to minimize the rate of prediction error and to maximize a correlation coefficient between the detected value and the predicted value, and such operations are so-called an automatic identification of the parameter.

In this embodiment, the number of embedding dimension, time delay, and the number of neighboring data are selected as a parameter, and an optimum combination thereof is selected. These parameters are used for generating a data vector in the prediction section 14.

The prediction section 14 predicts a data value at a time preceding a predetermined time period to the present time, by using the parameters determined in the parameter determining section 13 according to the local fuzzy reconstruction method. The result obtained in the prediction section 14 is outputted to the output section 15 and the prediction result storage section 16.

The output section 15 outputs the prediction result, and the prediction result storage section 16 stores the prediction result. The prediction result evaluating section 17 compares the prediction result with the actual data that is detected after the above-predetermined time period has passed. The actual data is obtained from the data storage section 12. This comparing is continually executed, and when the rate of the prediction error or the correlation coefficient is degraded, it is judged that the dynamics of the objective system is changed. Then, the prediction result evaluating section 17 outputs a signal commanding to the parameter determining section 13 so as to again execute the selection of optimum parameters.

Figure 2:
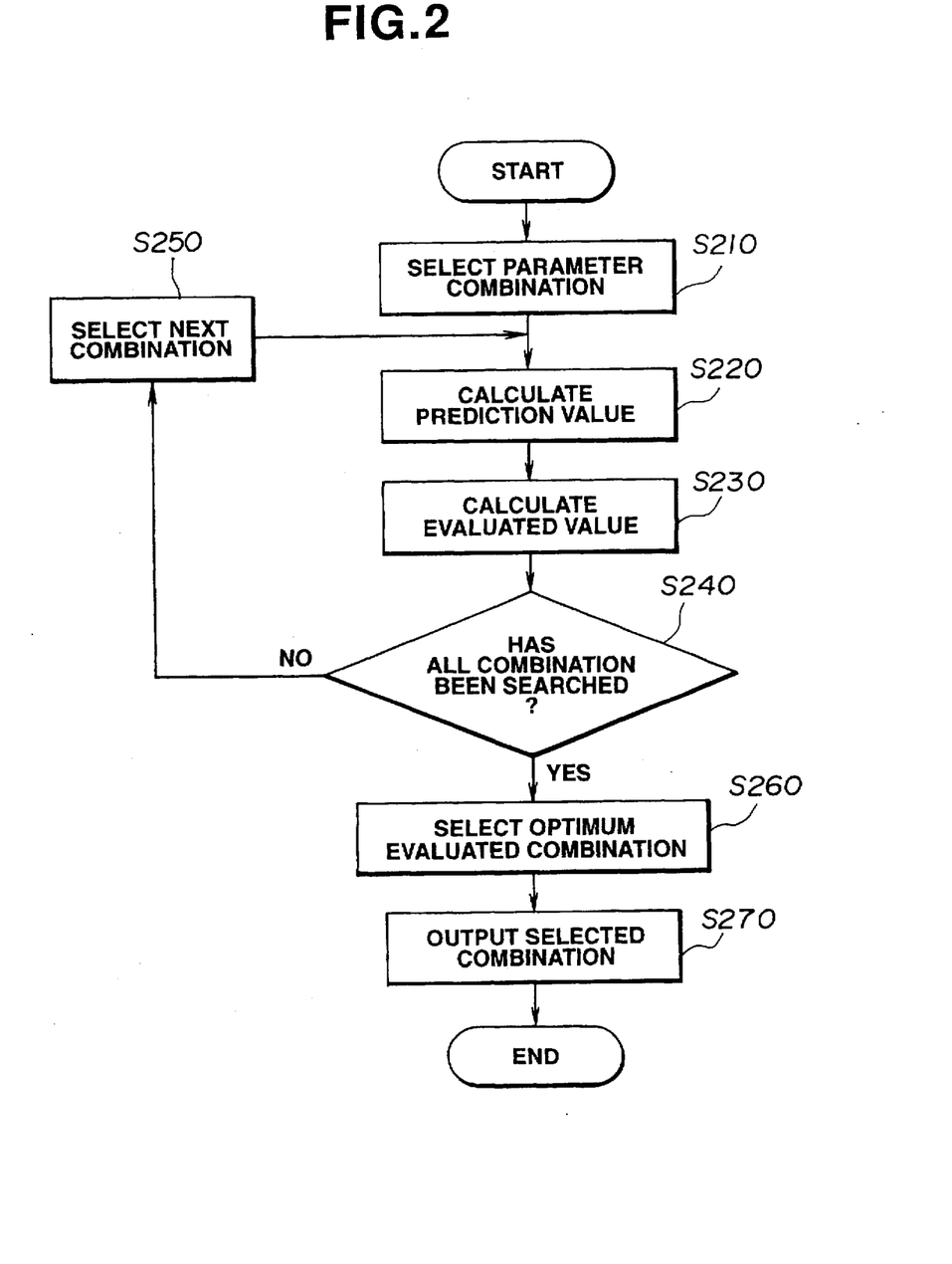
FIG. 2 is a flowchart executed by a parameter determining section of the prediction apparatus of FIG. 1.
Figure 3:
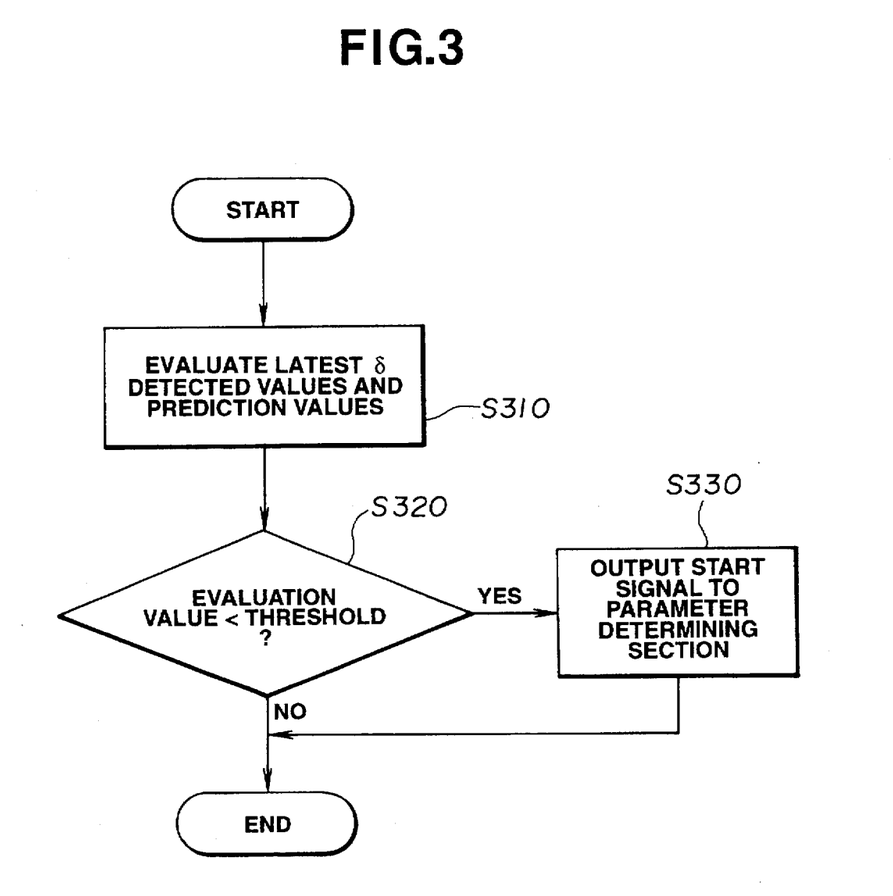
FIG. 3 is another flowchart executed by the parameter determining section.

Hereinafter, the manner of operation of the parameter determining section 13 will be discussed with reference to flowcharts of FIGS. 2 and 3 applied to a predetermined timeseries data. In this explanation, the data from a starting step to the 130th step have been previously obtained.

First, in a step S210, the parameter determining section 13 searches all combinations with respect to the embedding dimension n, the time delay τ and the number N of neighboring data vectors. In this search, the upper and lower limits of each of n, τ and N have been previously determined. The upper and lower limits in this case are set such that n is 2 to 6, τ is 3 to 7 and N is 2 to 8. Since n takes 5 kinds, τ takes 5 kinds and N takes 7 kinds, the number of combinations becomes 175=5×5×7.

In a step S220, the rate of the prediction error between the detected value (data) and the predicted value (data) is searched with respect to each combination. In case that the data from the start of the prediction to the 130th step are stored in the data storage section 12, when a prediction standard step is the α step, the data at the (α+1) step is predicted by using the data for β steps in the prediction section 14.

That is, when α=121 and β=20, the prediction of the data (test data) at the 122th step is executed by using the data from the 102th to the 121th steps.

Similarly, when α=122, the data from the 103th to the 122th steps are treated as past data, and the data at the 123th step is treated as test data. In this manner, the prediction is made of data at α step, where α takes the values ranging from 122 to 122+γ. In this example, by setting γ=9, the prediction was executed as to data from the 122th step to the 130th step. Since the latest data set in the already obtained data is treated as test data, it becomes possible to obtain the attractor which reflects the latest condition of the measured object system. In this example, β and γ may be freely set.

In a step S230, the predicted values from the 122th step to the 130th step are compared with the actual values of the 122th step to the 130th step, which values have been stored in the data storage section 12. Further, the evaluated value of this comparison is obtained by using the evaluation function defined by the correlation coefficient, the average error and the average rate of the error.

In steps S240 and S250, with respect to all combinations of the values of the parameters, the evaluation values are calculated.

In a step S260, a combination having (exhibiting) the highest evaluated value is selected, and in a step S270, the selected combination is outputted to the predicting section 14 as an optimum combination. In this example, n=3, τ=4 and N=3 were obtained as an optimum combination.

The predicting section 14 executes a prediction according to the optimum combination (n=3, τ=4 and N=3) by using the latest observed data. Since the optimum combination has been calculated at a time before the data of the 131th step is obtained, the prediction of the 131th step is executed by using this combination. The prediction results after the 131th step are outputted at the output section 15 and stored in the prediction result storage section 16.

In a step S310, the prediction result evaluating section 17 compares the latest δ numbers of the actual detected data obtained from the input section 11 with the predicted values corresponding to the actual detected data.

In steps S320 and S330, the prediction result evaluating section 17 outputs a signal for operating the parameter determining section 13 when the evaluated value in the step S310 is lower than the predetermined threshold value. Upon receipt of the signal, the parameter determining section 13 again searches the optimum parameter and outputs its result to the prediction section 14.

Although in the above example, the evaluation function by the correlation coefficient, the error and the average rate of the error has been used as an evaluation standard for determining the parameters, the evaluation function may be freely changed in accordance with the purpose of the prediction of the objective system. For example, when this prediction is applied to the electric power demand, the prediction accuracy at a peak value is required.

Next, the details of the predicting section 14 of the prediction apparatus according to the present invention will be discussed hereinafter with reference to a block diagram of FIG. 4.

Figure 4:
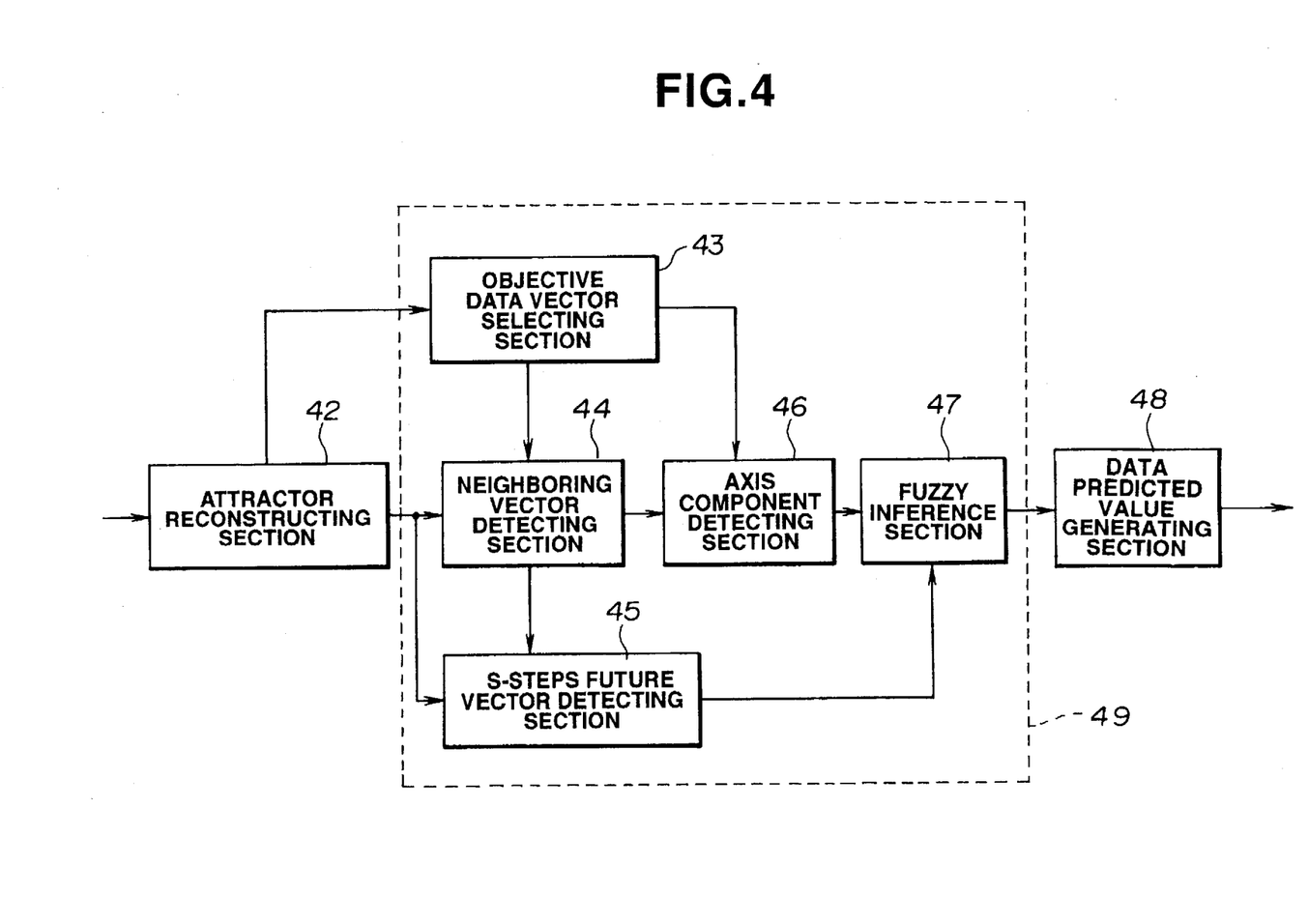
FIG. 4 is a block diagram that shows details of a prediction section shown in FIG. 1.

As shown in FIG. 4, the predicting section 14 comprises an attractor reconstructing section 42, an objective data vector selecting section 43, a neighboring vector detecting section 44, an s-step future vector detecting section 45, an axis component detecting section 46, a fuzzy inference section 47 and a data predicted value generating section 48.

The attractor reconstructing section 42 functions as a timeseries data storing means, a data vector generating means and an attractor reconstructing means. That is, the attractor reconstructing section 42 reads the timeseries data y(t) at equal sampling time intervals and generates data vectors for executing a deterministic short-term prediction on the basis of the deterministic chaotic (non-liner) dynamics theory. Further, the attractor reconstructing section 42 generates an n-dimensional state space data-base by reconstructing the attractor of the data vectors in the n-dimensional state space according to the Takens' theory.

As shown in FIG. 4, a local fuzzy reconstructing section 49 for generating a local dynamics of attractor and for generating the data-base thereof is constituted by the objective data vector selecting section 43, the neighboring vector detecting section 44, the s-steps future vector detecting section 45, the axis component detecting section 46 and the fuzzy inference section 47.

The data predicted value generating section 48 generates a predicted value of the data on the basis of the processed result in the local reconstructing section 49.

The attractor reconstructing section 42 generates the vector x(t) represented by the following formula:

$$x(t)=(y(t), y(t-\tau), y(t-2\tau), \ldots y(t-(n-1)\tau))$$

where $$\{(n-1)\tau+1\} \leq t \leq N.$$

Further, by applying the values determined in the parameter determining section 13 to the number n of the embedding dimension and the time-delay τ, the state space and attractor are reconstructed according to the embedding procedure.

Figure 5:
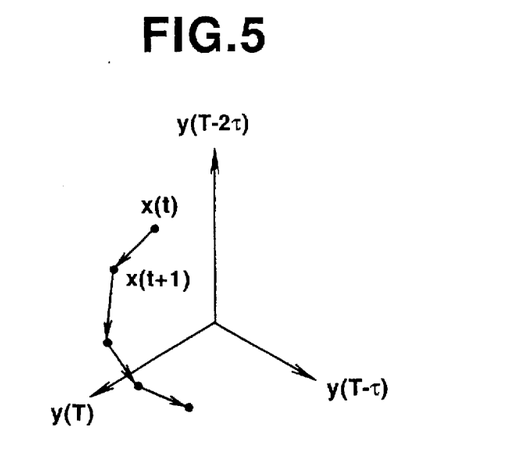
FIG. 5 is a view for explaining a trajectory of data vectors.

As mentioned above, the vector indicates one point of an n-dimensional reconstructed state space $R^n$. Therefore, a trajectory can be drawn in the n-dimensional reconstructed state space by changing "t", for example, as shown in FIG. 5. In order that such reconstruction achieves "embedding", it has been proven that the dimension "n" should satisfy the following condition n≧2m+1, where "m" represents the state space dimension of the original dynamical system. Normally, a short-term prediction can be executed if the number n of the embedding dimension takes a value of 3 or 4 (n=3~4). Accordingly, setting n and τ to satisfy the above condition, the state space and attractor are reconstructed according to the embedding procedure.

Figure 6:
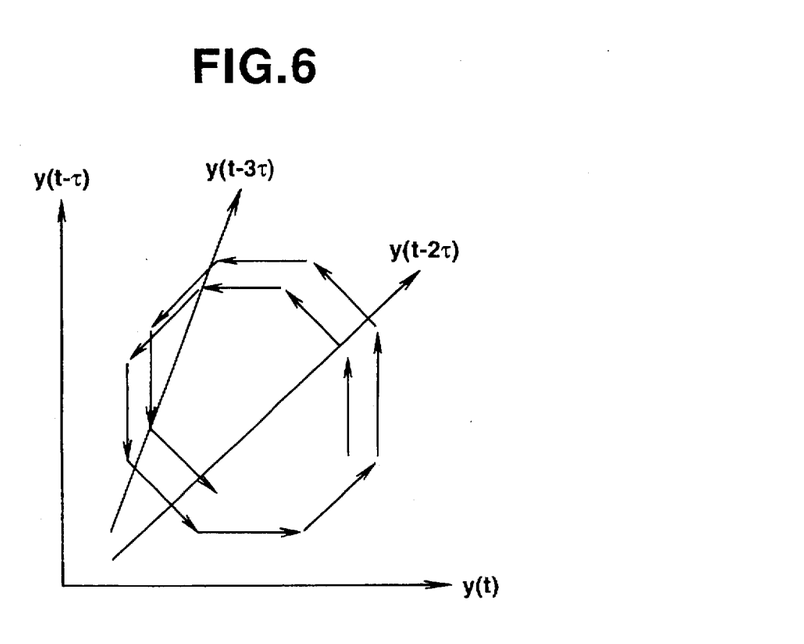
FIG. 6 is a view for explaining an attractor.

When the behavior of the data to be predicted follows to the deterministic chaos, the attractor in the state space is a smooth manifold as shown in FIG. 6. Therefore, it becomes possible to execute a perdition of the data by utilizing the attractor.

In the local fuzzy reconstructing section 49, the data vector to be observed (normally, data vector obtained by the latest observation) is determined as z(t), and a predicted value z"(T+s) of data vector is generated after s steps of data vector z(T).

The objective data vector selecting section 43 selects the data vector to be observed (normally the latest data vector z(t)), and outputs it to the neighboring vector detecting section 44.

At the neighboring vector detecting section 44, a plurality of neighboring vectors of the data vector z(T) are detected from the data vector in the attractor reconstructing section 42. Where i∈N(z(T)), N(z(T)) and z(T) are the set of index "i" of x(i) neighboring to z(T).

An axis component detecting section 46 detects axis components of z(T) and x(i) and outputs them to a fuzzy inference section 47.

An s-steps future vector detecting section 45 detects a vector x(i+s), which is generated after "s" steps of the vector x(i), and outputs it to a fuzzy inference section 47.

The fuzzy inference section 47 compares component values of z(T) and x(i) by each axis, and determines each component value of the predicted value (vector z"(T+s)). A predicted vector z"(T+s) obtained from them is outputted to the data predicted value generating section 48.

Since the trajectory of the attractor is normally formed in a smooth manifold, it is preferable that the trajectory may be obtained by non-linearly determining the axis components, rather than linearly obtaining them.

Hereinafter, the determining procedures of the axis components by using the fuzzy theorem will be discussed.

If data is generated according to the deterministic regularity (rules) and "s" is sufficiently small, the procedure that the data x(i) approaches the data x(i+s) "s" steps ahead, can be assumed to be based on the dynamics according to the deterministic theorem.

Further, this dynamics can be represented by the following linguistic forms:

IF z(T) is x(i) THEN z(T+s) is x(i+s)

where x(i) is the set representing data vector neighboring to z(T) in a n-dimensional reconstruction state space, x(i+s) is a set representing data vector after "s" steps of x(i), and i∈N(z(T)), N(z(T)) is a set of index i of the vector x(i) neighboring to z(T).

Since x(i) is a data vector neighboring to z(T), in case that after "s" steps, the deterministic regularity is not lost.

Therefore, before step "s" loses deterministic causality, it can be assumed that the dynamics from transition from state z(T) to state z(T+s) is approximately equivalent to that from state x(i) to state x(i+s) because chaos has a "sensitive dependency on initial value". When the attractor embedded in the n-dimensional reconstructed state space is smooth manifold, the vector distance (trajectory) from z(T) to z(T+s) is influenced by the Euclidean distance from z(T) to x(i). That is, it can be assumed that the nearer the trajectory of x(i) becomes to that of z(T), larger the influence of z(T) becomes regarding to the trajectory from z(T) to z(T+i).

Since x(i) and x(i+s) can be expressed as follows:

$$x(i)=(y(i), y(i-\tau) \ldots, y(i-(n-1)\tau))$$
$$x(i+s)=(y(i+s, y(i+s-\tau), \ldots, y(i+s-(n-1)\tau)) \quad (1)$$

these formula can be rewritten as follows when focusing attention on the "j" axis in the n-dimensional reconstructed state space.

IF aj(T) is yj(i) THEN aj(T+s) is yj(i+s)  (2)

where $1 \leq j \leq n$, aj(T) is J-axis component of x(i) value neighboring to z(T) in n-dimensional reconstructed state space, aj(T+s) is J-axis component of x(i+s) in n-dimensional reconstructed state space, and n is embedding dimension.

Also, the trajectory from z(t) to z(T+s) is influenced by Euclidean distance from z(T) to x(i). This influence becomes nonlinear because of a smooth manifold. Hence, for rendering a nonlinear characteristic, formula (2) can be expressed by fuzzy function as follows.

IF aj(T) is y'j(i) THEN aj(T+s) is y'j(i+s)  (3)

where $1 \leq j \leq n$, and subscript mark ' denotes fuzzy function.

From the formula $$z(T)=(y(T), y(T-\tau), \ldots, y(T-(n-1)\tau))$$

the J-axis component of z(T) in the n-dimensional reconstructed state space becomes equal to yj(T).

Accordingly, the J-axis component of the predicted value z"(T+s) of data vector z(T+s) after "s" steps of z(T) is obtainable as aj(T) of formula (3). This method is called "Local Fuzzy Reconstruction method".

Explanation thereof is given below on a concrete example where the dimension of embedding n=3, delay time τ=4, and the number of neighboring data vectors N=3.

Assuming that each data vector takes values as follows:

z(T)=(y1(T), y2(T−4), y3(T−8))

x(a)=(y1(a), y2(a−4), y3(a−8))

x(b)=(y1(b), y2(b−4), y3(b−8))

x(c)=(y1(c), y2(c−4), y3(c−8))

z"(T+s)=(z1(T+s), z2(T+s−4), z3(T+s−8))

x(a+s)=(y1(a+s), y2(a+s−4), y3(a+s−8))

x(b+s)=(y1(b+s), y2(b+s−4), y3(b+s−8))

x(c+s)=(y1(c+s), y2(c+s−4), y3(c+s−8))

the fuzzy rule given in formula (3) can be represented by the following formulas (4), (5) and (6).

Regarding the first axis of reconstructed state space:

IF a1(T) is y'1(a) THEN a1(T+s) is y'1(a+s)

IF a1(T) is y'1(b) THEN a1(T+s) is y'1(b+s)

IF a1(T) is y'1(c) THEN a1(T+s) is y'1(c+s)  (4)

Regarding the second axis of reconstructed state space:

IF a2(T) is y'2(a) THEN a2(T+s) is y'2(a+s)

IF a2(T) is y'2(b) THEN a2(T+s) is y'2(b+s)

IF a2(T) is y'2(c) THEN a2(T+s) is y'2(c+s)  (5)

Regarding the third axis of reconstructed state space:

IF a3(T) is y'3(a) THEN a3(T+s) is y'3(a+s)

IF a3(T) is y'3(b) THEN a3(T+s) is y'3(b+s)

IF a3(T) is y'3(c) THEN a3(T+s) is y'3(c+s)  (6)

Figure 8A:
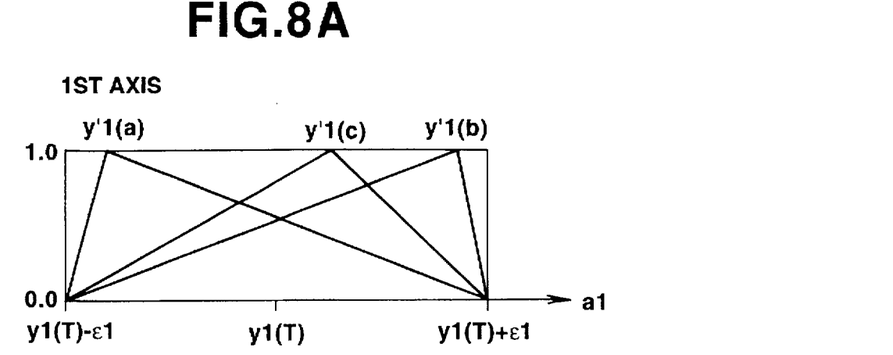
FIGS. 8A, 8B and 8C are graphs of membership functions of the respective axes.
Figure 8B:
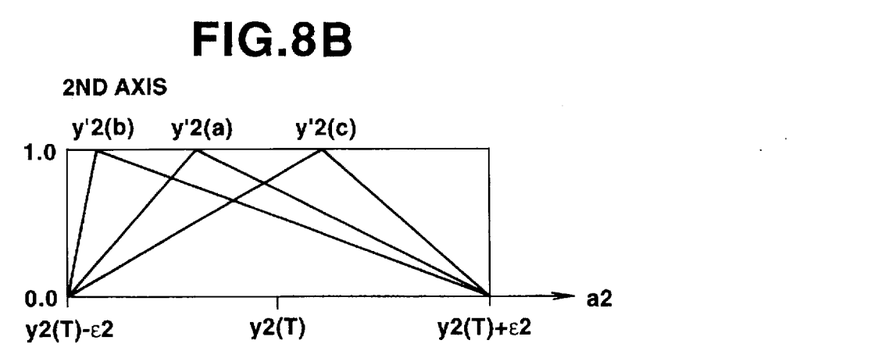
Figure 8C:
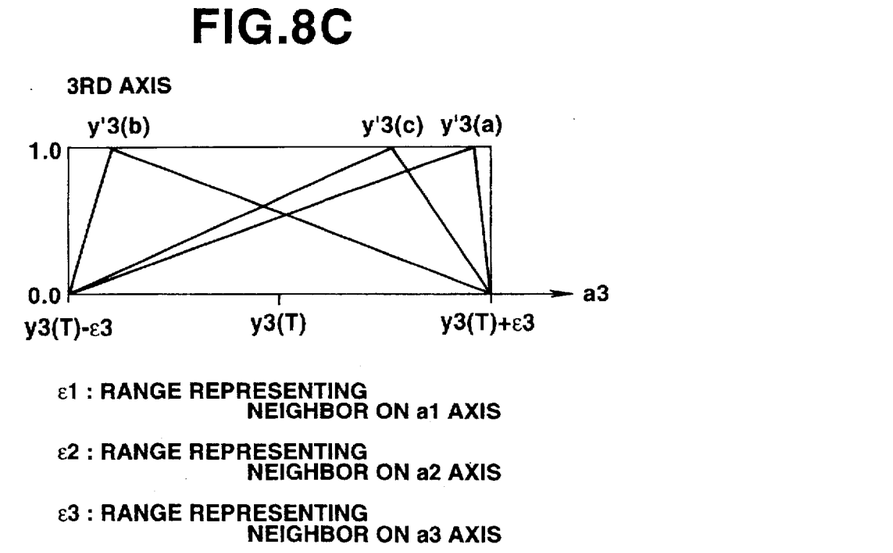

Also, since x(a), x(b) and x(c) are neighboring data vectors around z(T), each axis of the reconstructed state space in the antecedent statement of fuzzy rules (4), (5) and (6) has the membership function shown in FIGS. 8A, 8B and 8C. Further, the membership functions in the subsequent statement are all of a crisp concise expression for speeding up computation.

For the dynamics expressed by the above fuzzy rules and membership functions, we now conduct a fuzzy inference with the following taken as input data: a1(T)=y1(T), a2(T)=y2(T) and a3(T)=y3(T). In consequence, the following formulas are obtained:

$$y''1(T+s)=a1(T+s)$$

$$y''2(T+s-4)=a2(T+s)$$

$$y''3(T+s-8)=a3(T+s) \quad (7)$$

Thus, the predicted value y1(T+s) after the original timeseries data y1(T) has advanced "s" steps is available as a1(T+s).

Next, as a concrete application, hereinafter, the application to the behavior prediction of a logistic map which is well known as timeseries data under chaotic behavior, will be discussed.

The logistic map was demonstrated in 1973 by R. May through numeric experiments that an irregular phenomenon, namely a chaotic phenomenon governed by determinism, could be generated from a simple difference equation given in formula (8).

$$X_{n+1}=f(X_n)+aX_n(1-X_n) \quad (8)$$

where $1 \leq a \leq 4$.

In formula (8), if "n" is set to $\infty$ at different "a" values, Xn behaves as follows:

$1 \leq a \leq 2$: $X_n$ converges to $(1-1/a)$.

$2 \leq a \leq 3$: $X_n$ converges to $(1-1/a)$ through fluctuation.

$3 \leq a \leq 1+\sqrt{6}$: $X_n$ does not converge (asymptotic to 2-period).

$1+\sqrt{6} \leq a \leq 3.57$: $X_n$ does not converge (asymptotic to $2^m$ period).

$3.57 \leq a \leq 4$: $X_n$ does not converge (chaotic state).

Figure 9:
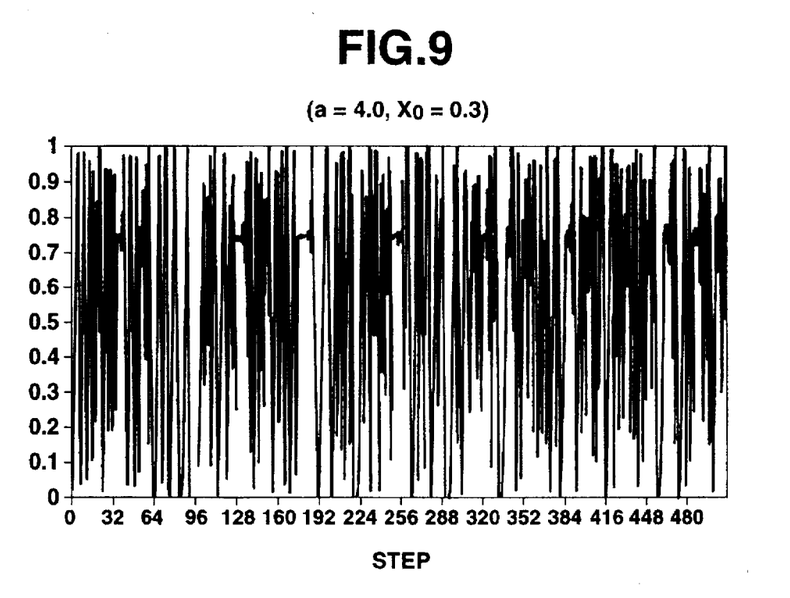
FIG. 9 is a graph showing timeseries data of logistic map.
Figure 10A:
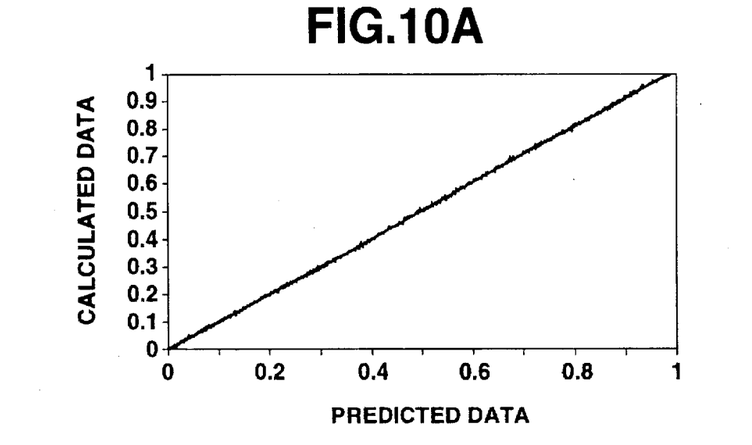
FIGS. 10A, 10B and 10C are graphs showing a prediction result of the logistic map.
Figure 10B:
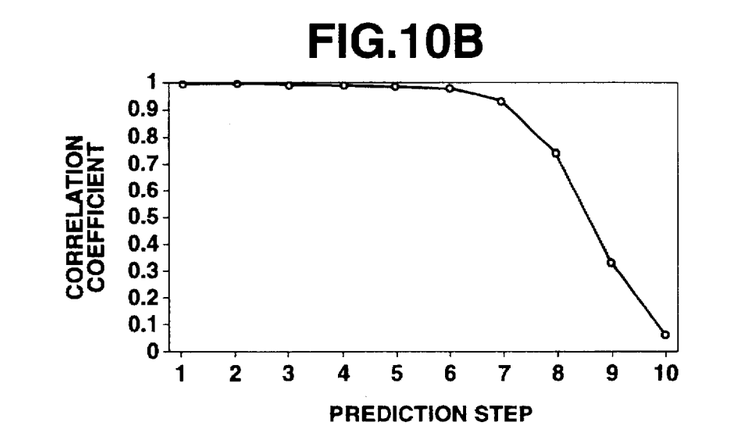
Figure 10C:
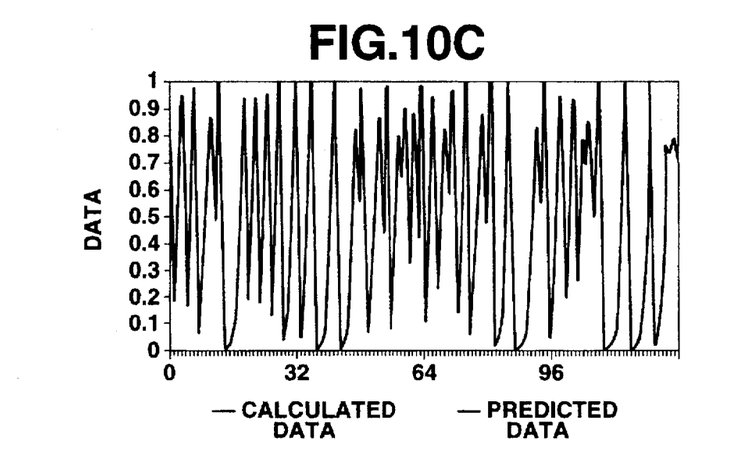

FIG. 9 shows timeseries data of a logistic map under a chaotic condition. FIGS. 10A, 10B and 10C show results of the predicted behavior obtained by utilizing the data of FIG. 9. As clear from FIG. 10A, the correlation between the calculated data and the predicted data are exceedingly high. Further, timeseries of the predicted data is generally corresponding with that of the calculated data, as shown in FIG. 10C. In addition, as shown in FIG. 10B, the correlation coefficients from a start step to about the seventh step are larger than 0.9. This indicates that the high correlation is achieved by this method.

With the thus arranged embodiment, since the value of each parameter is again selected in case that the prediction accuracy becomes smaller than a threshold value, it is possible to accurately execute a short-term prediction even when the dynamics of the timeseries data are changed.

Furthermore, since the component value of the objective data vector at a predetermined time period future is determined by generating membership function with respect to the axis component value of the neighboring vector and executing fuzzy inference upon using the membership function, it becomes possible to execute the short-term prediction with high-accuracy upon taking the nonlinear behavior of the attractor into account.

Although as an example of the prediction an application to the logistic map has been shown and described in this embodiment, it will be understood that this method and apparatus may be applied to deterministic non-linear timeseries data by a formula model, such as the timeseries data obtained from the Lorenz's equation of atmospheric circulation. Furthermore, the method according to the present invention may be applied to the predictions relating to various social phenomena, such as the tap water demand, the electric power demand, the gas demand and the traffic density, and to the predictions relating to various natural phenomena, such as temperature change and weather change.

Figure 11:
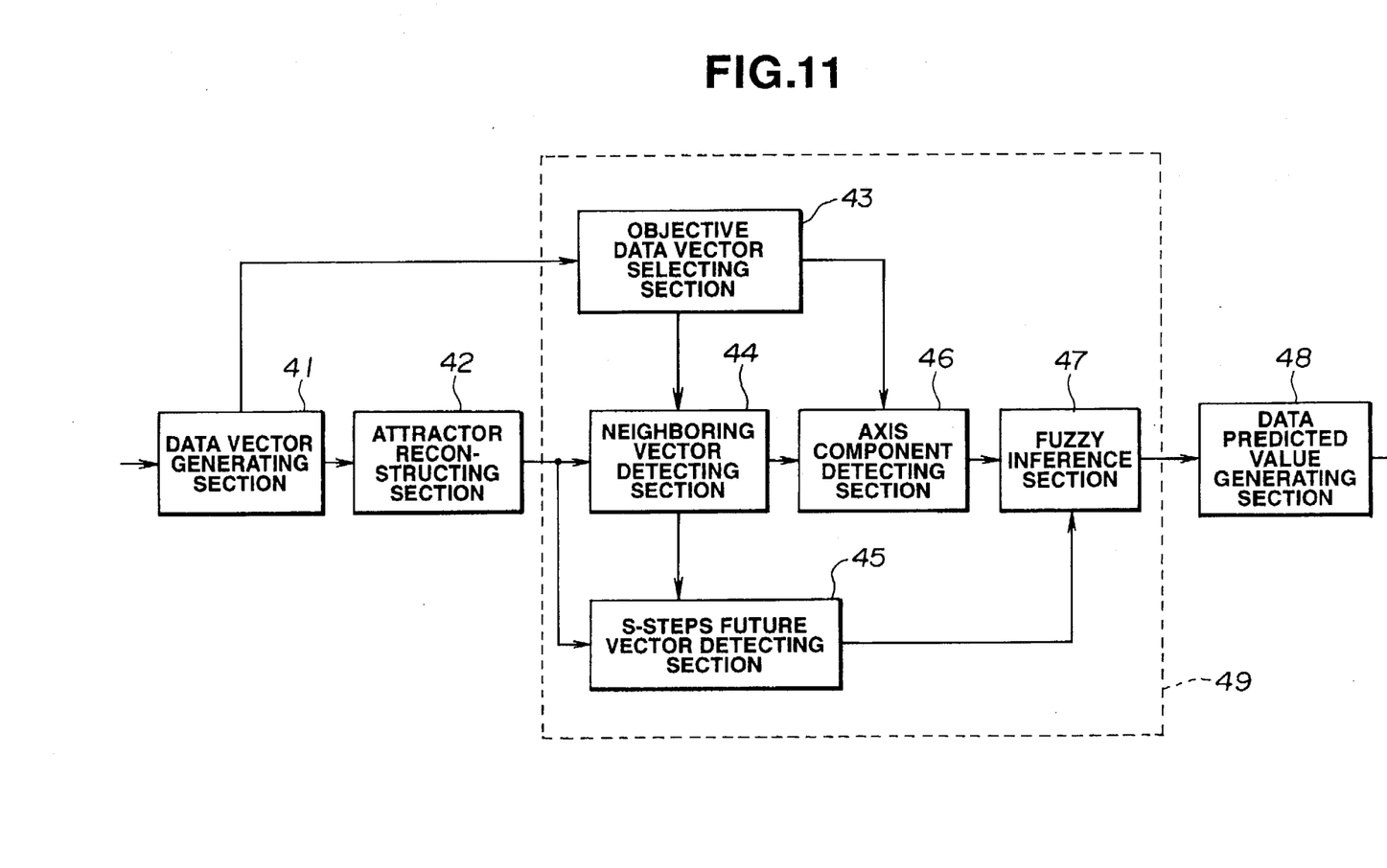
FIG. 11 is a block diagram which shows modification of FIG. 4.

While in this embodiment the attractor reconstructing section 42 has been shown and described to function as a timeseries data storing means, a data vector generating means and an attractor reconstructing means, it will be understood that this section 42 may be further divided into a data vector generating section functioning as a timeseries data storing means and data vector generating means and to the attractor reconstructing section functioning as an attractor reconstructing means, as shown in FIG. 11.

What is claimed is:

1. An apparatus for executing a short-term prediction of chaotic timeseries data, said apparatus comprising:

a data storage means for storing, as sample data, detected values of the timeseries data;

a parameter determining means for selecting a value of each of a plurality of parameters to be a component of a data vector;

a predicting means for generating the data vector from the detected values of the timeseries data according to the value of each parameter determined by said parameter determining means, and for obtaining a predicted value by reconstructing an attractor into a predetermined dimensional state space by means of embedding;

a prediction result storage means for storing the obtained predicted value; and a prediction result evaluating means for detecting a predicted value corresponding to the detected values of the timeseries data from said prediction result storage means, and for evaluating a prediction accuracy by comparing the detected value and the predicted value, wherein said parameter determining means selects a subset of the sample data at a predetermined time and a predetermined number of past data with respect to the sample data stored in said data storage means, said parameter determining means receiving a predicted value of the subset of the sample data on the basis of each combination of the parameters from said predicting means, said parameter determining means comparing the predicted value of the subset of the sample data from said prediction means with an actual value of the subset of the sample data, said parameter determining means again executing to select an undated value of each of the parameters so that a prediction accuracy of the sample data takes a maximum value, and outputting the updated selected values of the parameters to said predicting means, wherein said parameter determining means determines the maximum value from all possible combinations of values of the parameters, so as to obtain one combination of values of each of the parameters of the data vector corresponding to the maximum value, the maximum value being outputted as the updated selected values of the parameters to said predicting means, and wherein said predicting means reconstructs the attractor by embedding, using the updated selected values and a most-recently-stored sample of said sample data.

2. A prediction apparatus as claimed in claim 1, wherein said predicting means comprises a local fuzzy reconstructing means that comprises:

a neighboring vector detecting means for detecting a plurality of vectors neighboring to the data vector by using the reconstructed attractor;

an axis component detecting means for detecting a difference between an axis component value of the detected each neighboring vector and an axis component value of the data vector;

a fuzzy inference means for determining the axis component value of the data vector at a predetermined time period ahead upon detecting the axis component value of each of the neighboring vectors at the predetermined time period ahead, so as to decrease a difference between the detected axis component value of each neighboring vector at the predetermined time period ahead and the component value of the neighboring vector that generated the minimum difference in said axis component detecting means; and a prediction data generating means for generating prediction data by transforming the result in said fuzzy inference means into timeseries data, wherein a state-space structure of the predetermined dimensional state space is undated based on the updated selected values of the parameters, and wherein the attractor is reconstructed based on the updated state-space structure.

3. A prediction apparatus for executing a short-term prediction of non-linear timeseries data, said prediction apparatus comprising:

a storage means for storing observed timeseries data;

a data vector generating means for generating a data vector having a component that is constituted by the observed timeseries data from said storage means;

an attractor reconstructing means for generating an attractor of the observed timeseries data in an n-dimensional state space by an embedding operation of the data vector;

a neighboring vector detecting means for detecting a plurality of vectors neighboring to the data vector generated in said data vector generating means;

an axis component detecting means for detecting a difference between an axis component value of each of the detected neighboring vector and an axis component value of the data vector;

a fuzzy inference means for determining the axis component value of the data vector at a predetermined time period ahead upon detecting the axis component value of each of the neighboring vectors at the predetermined time period ahead, so as to decrease a difference between the detected axis component value of each neighboring vector at the predetermined time period ahead and the axis component value of the neighboring vector that generated the minimum difference in said axis component detecting means; and a prediction data generating means for generating the prediction timeseries data of the observed timeseries data by transforming the processing result in said fuzzy inference means into timeseries data, wherein a state-space structure of the n-dimensional state space is updated based on the processing result of the fuzzy inference means.

4. A prediction apparatus as claimed in claim 3, wherein said fuzzy inference means generates a membership function that takes a peak at each axis component value of the neighboring vectors, and determines a component value after predetermined steps of the axis component value of the data vector by means of a fuzzy inference that applies the membership function.

5. A method for executing a short-term prediction of timeseries data under chaotic condition, comprising the steps of:

(a) storing, as sample data, measured values of timeseries data;

(b) selecting a value of each parameter to be a component of a data vector;

(c) generating the data vector from the detected values of the timeseries data according to the value of each parameter determined by said step (b) and obtaining a predicted value by reconstructing an attractor into a predetermined dimensional state space by embedding;

(d) storing the obtained predicted value;

(e) evaluating a prediction accuracy by comparing the detected value and the predicted value upon detecting the predicted value corresponding to the detected values of the timeseries data from said step (d);

(f) selecting a subset of the sample data at a predetermined time and a predetermined number of past data with respect to the sample data stored in said step (a);

(g) receiving a predicted value of the subset of the sample data on the basis of each combination of the parameters from said step (c); and (h) comparing the predicted value of the subset of the sample data from said step (c) with an actual value of the subset of the sample data, said step (b) again executing to select an updated value of each of the parameters so that a prediction accuracy of the sample data takes a maximum value, and outputting the undated selected values of each of the parameters to said step (c), wherein the updated selected values are used to update a state-space structure of the predetermined dimensional state space used in said step (c).

6. A method as claimed in claim 5, wherein the step (c) comprises the steps of:

(i) detecting a plurality of vectors neighboring to the data vector by using the reconstructed attractor;

(j) detecting a respective difference between an axis component value of each of the detected neighboring vectors and an axis component value of the data vector;

(k) determining the axis component value of the data vector at a predetermined time period ahead upon detecting the axis component value of each of the neighboring vectors at the predetermined time period ahead, so as to decrease a difference between the detected axis component value of each neighboring vector at the predetermined time period ahead and the axis component value of the neighboring vector that generated the minimum difference in said step (j); and (l) generating the predicted value by transforming the processing result in said step (h) into timeseries data.

7. A method for executing short-term prediction of timeseries data under chaotic behavior, said prediction method comprising the steps of:

(a) storing timeseries data to be observed;

(b) generating a data vector having a component that is constituted by the timeseries data;

(c) generating an attractor of the timeseries data in an n-dimension state space by an embedding operation of the data vector;

(d) detecting a plurality of vectors neighboring to the data vector;

(e) detecting a respective difference between an axis component value of each of the detected neighboring vectors and an axis component value of the data vector;

(f) determining the axis component of the data vector at a predetermined time period ahead upon detecting the axis component value of each of the neighboring vectors at the predetermined time period ahead, so as to decrease a difference between the detected axis component value of each neighboring vector at the predetermined time period ahead, and the axis component value of the neighboring vector that generated the minimum difference in the step (e); and (g) generating the predicted value by transforming the processing result in said step (f) into timeseries data, wherein the minimum difference is used to update a state space structure of the n-dimension state space used in the embedding operation.

8. A method as claimed in claim 7, wherein the step (f) further comprises the steps of:

(h) generating a membership function that takes a peak value at each axis component value of the neighboring vectors; and (i) determining a component value at a predetermined time period ahead of the axis component of the data vector by use of a fuzzy inference that applies the membership function.

* * * * *